Dec. 2, 1969        P. C. TABOR        3,481,646
TILTING SEAT BACK ADJUSTER AND LATCHING MEANS
Filed March 5, 1968        2 Sheets-Sheet 1
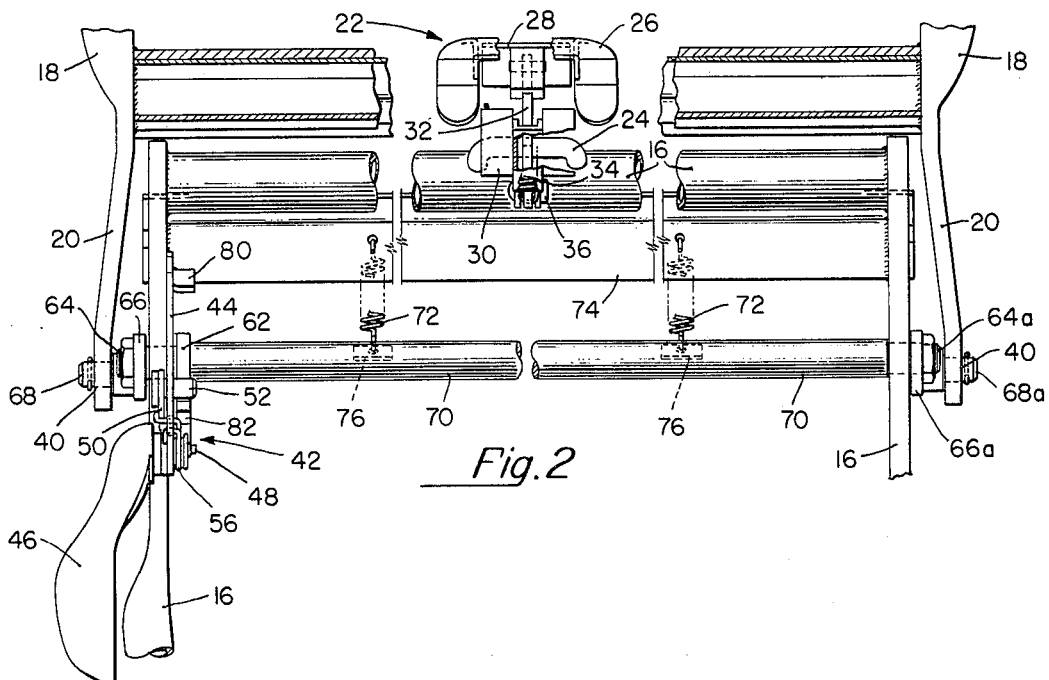
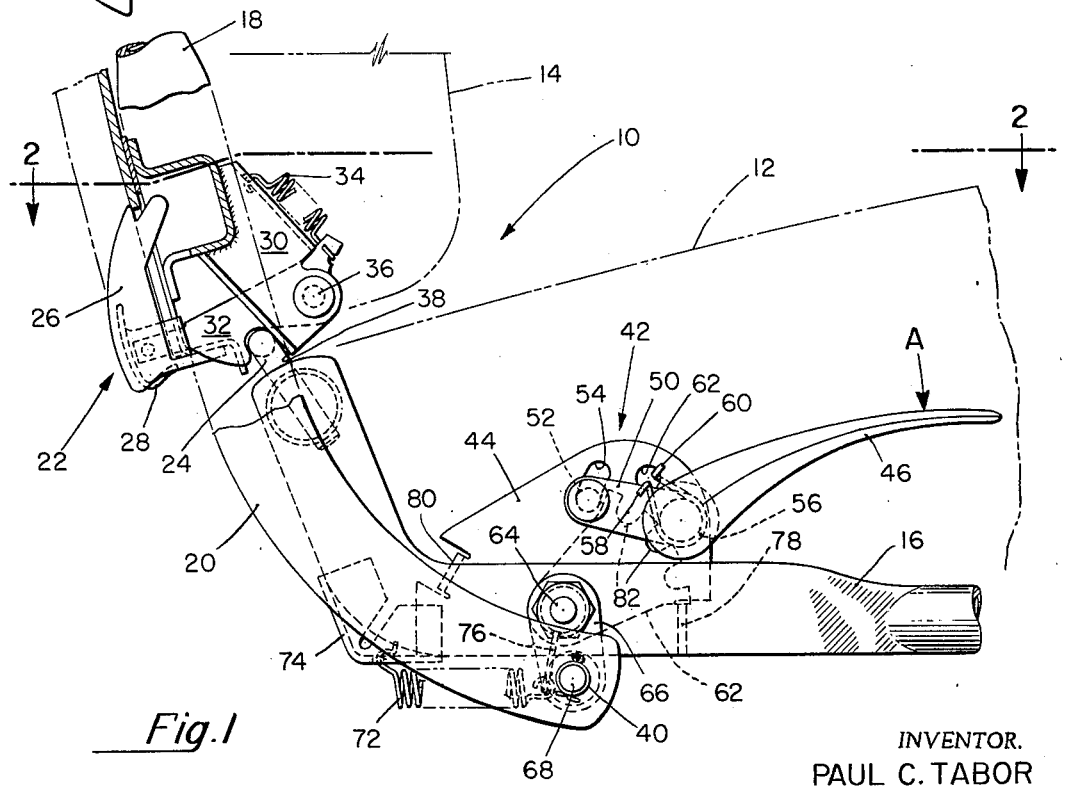
INVENTOR.
PAUL C. TABOR
BY
ATTORNEY United States Patent Office 3,481,646
Patented Dec. 2, 1969

3,481,646
TILTING SEAT BACK ADJUSTER AND LATCHING MEANS
Paul C. Tabor, Clawson, Mich., assignor, by mesne assignments, to The Budd Company, Philadelphia, Pa., a corporation of Pennsylvania
Filed Mar. 5, 1968, Ser. No. 710,454
Int. Cl. B60n 1/06
U.S. Cl. 297—355         6 Claims

ABSTRACT OF THE DISCLOSURE

A control apparatus for a tilting seat back for a vehicle seating unit. A notched sector gear cooperates with a spring biased pawl for securing a seat back in a plurality of positions of tilt. A seat back lock permits release of the seat back from a tilted seating position for folding to permit access to rear seats and return to the previously selected tilted position.

---

This invention relates to a seating unit and more particularly to a seating unit having a movable back adjustable to a plurality of tilted positions and foldable forwardly over the seat bottom.

With the increased emphasis on luxury and safety in modern motor vehicles, the folding front seats of two door automobiles have been modified into individual "bucket" seats. The seat backs of these bucket seats have also been made tiltably adjustable for greater comfort and the seat back has been provided with a latch mechanism to hold it in place during rapid deceleration and during accidents for safety purposes.

The seat back of this invention is tiltably adjustable to a plurality of tilted seat forming positions. A latching means secures the seat from folding forward over the seat bottom until the latch is released. The lock bar of the latching means also acts as a variable pivot point for the seat back during the tilting adjusting thereof.

It is an object of this invention to provide an adjustable seat back with latching means for holding the seat back in a seat forming position until released therefrom.

Another object of this invention is to provide a seat back adjustable to a plurality of seat forming positions and foldable forwardly over the seat bottom for easy entrance to the rear of the vehicle.

A further object of this invention is to provide a control mechanism for an adjustable seat back in which a latching means is provided for securing the seat back from folding forwardly and the latching means also provides a variable pivot bar about which the seat back may be pivoted to a plurality of tilted positions.

These and other objects of this invention will be made more apparent from the following specification and the accompanying drawing wherein:

FIG. 1 is a side view of a vehicle seat in the upright seating position with sections broken off and the seat cushions and trim shown in phantom lines, and illustrating the novel seat back latching means and tilt adjuster.

FIG. 2 is a view in the direction of the arrows substantially along line 2:2 of FIG. 1 with sections broken away and showing the plan view of the seat back tilt adjuster and latching means.

Figure 3:
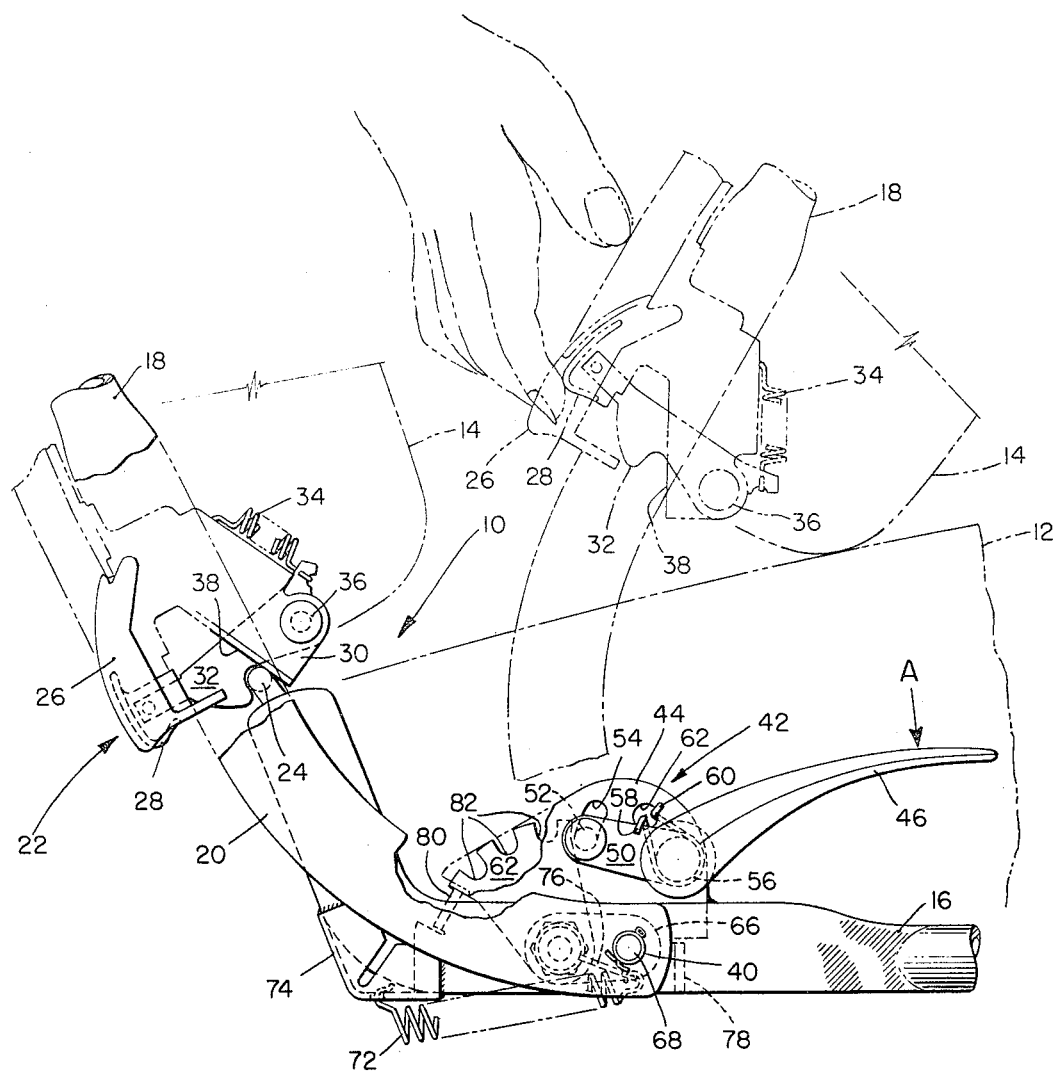
FIG. 3 is the same view as FIG. 1 with the seat back in the fully tilted position, most removed from the upright seating position of FIG. 1 and in phantom lines, showing the seat back in the folded easy entrance position.

Referring now to the drawings, the vehicle seating unit 10 includes a seat 12 and seat back 14. The seat 12 includes a generally rectangular seat frame 16 which is secured to the vehicle floor by conventional support means (not shown) and also supports the springs, padding and trim (not shown) in a conventional manner. The seat back 14 includes a rectangular frame 18 having depending arms 20 extending from the side rails of the seat back frame 18 for being pivotally secured to the seat frame 16 for supporting the seat back 16 on the seat 14.

A latching means 22 for securing the seat back in an upright seat forming position includes a latch bar 24 secured to the seat frame 16, a latch bezel 26 secured to the seat back frame 18 substantially in the plane of the trim fabric and supporting the latch handle 28 for sliding movement therein. A latch stanchion 30 is secured to the seat back frame 18 and pivotally supports the latch or hook lever 32 for pivotal movement about pivot point 36 into engagement with the latch bar 24. A tension spring 34 is connected to and extends between one end of the latch 32 and the stanchion 30 for biasing the latch 32 into a locked position as seen in FIG. 1 and also permitting manual movement of the latch 32 by the handle 28 to the unlocked position as shown in phantom lines in FIG. 3. When the seat back 14 is in seat forming position, the spring 34 continuously biases the latch 32 into contact with latch bar 24 about pivot point 36 during all positions of adjustment of the seat back. The contact face 38 of stanchion 30 bears against the latch bar 24 in seat forming positions of the seat back and limits counter-clockwise rotation of the seat back about pivotal connection 40, as viewed in FIGS. 1 and 3.

The seat back control apparatus as best seen in FIGS. 1 and 3, and indicated generally by numeral 42, includes a mounting plate 44 secured to the seat frame 16 by welding or other suitable means, a control handle 46 is secured to a shaft 48 for rotation therewith and the shaft 48 is axially secured and journaled in plate 44. A control arm 50 having a locking pawl 52 secured to one end thereof is secured to shaft 48 for rotation therewith. The pawl 52 extends through a slot 54 in the mounting plate 44 and is spring biased to the lower end of slot 54 by torsion spring 56. Torsion spring 56 is positioned about shaft 48 with one arm 58 contacting control arm 50 and other arm 60 anchored in aperture 62 of mounting plate 44 for biasing the control arm 50 in a counter-clockwise direction when viewed in FIGS. 1 and 3.

A sector 62 is secured to shaft 64 which is journaled in the mounting plate 44 and seat frame 16. A seat support lever 66 has one end secured to the sector shaft 64 on the outside of the seat frame 16 and a support pin 68 mounted in the other end for rotatably supporting the seat back 14 thereon by acting as the pivot pin in pivotal connection 40. A torque tube 70 is connected to the inner end of shaft 64 and has the other end connected to a slave shaft 64a journaled in the opposite side of the seat frame 16 which has a support lever 66a and support pin 68a for supporting the other side of the seat back 14.

A pair of tension springs 72 are connected to a cross member 74 of the seat frame and to arms 76 welded to the torque tube 70 for biasing the torque tube in a clockwise direction as seen in FIGS. 1 and 2 and thus urging the seat back 14 to the upright position shown in FIG. 1. In the full forward position the sector 62 bears against forward stop 78 formed by a tab bent at right angles from the mounting plate 44. A second rearward stop 80 cooperates with the sector 62 to limit the rearward movement of the seat back 14 as seen in FIG. 3. A plurality of notches 82 are formed along the outer edge of sector 62 for cooperating with pawl 52 to hold the seat back 14 in various positions of adjustment between the full forward position of FIG. 1 and the full rearward position of FIG. 3.

In operating this novel seat back, to change the angle of tilt of the seat back 14, the control handle 46 is depressed in the direction A, as shown by the arrow. The clockwise rotation of handle 46 also pivots control arm 50 clockwise and moves pawl 52 within slot 54 and out of interference contact with sector 62, thus permitting the seat back 14 to be tilted about latch bar 24 to the desired tilted position. Such tilting of the seat back 14 is accomplished by applying counter-clockwise pressure to the front of the seat back for pivoting and sliding the seat back about latch bar 24 as the pivotal connection 40 is moved counter-clockwise about sector shaft 64. The counter-clockwise rotation of sector shaft 64 increases the tension in springs 72 and rotates the sector 44 counter-clockwise until the desired position of tilt has been achieved. The counter-clockwise rotation of seat support lever 66 increases the lever arm from the pivotal connection 66 to the latch bar 24 and helps tilt the seat back 14 as the stanchion 30 pivots and slides on the latch bar during tilting movement. When the desired position has been reached, the handle 46 is released and spring 56 causes the control arm 50 and handle 42 to rotate counter-clockwise until the pawl 52 is seated in the appropriate notch 82 of sector 44 for securing the seat back 14 in the tilted position. In the illustrated embodiment there are four positions of tilt but more may be provided, if desired, by increasing the number of notches or the size of the sector.

To return the seat back 14 to the upright position, the handle 46 is depressed in the direction indicated by arrow A and when the pawl clears the notch 82 of sector 44, the biasing action of the springs 72 will return the seat back to the upright position.

If entrance to the rear seating area of a vehicle, equipped with this seat adjuster, is desired, the latch handle 28 is moved upwardly in the bezel 26. Such movement of the handle will overcome the biasing action of latch spring 34 and raise the hook lever 32 from contact with latch bar 24, thus permitting the seat back 14 to be pivoted clockwise about pivotal connection 40 to easy entrance position shown in phantom lines in FIG. 3. When the seat back 14 is rotated counter-clockwise back to the seat forming position, the hook of latch 32 will cam over the latch bar 24 and be snapped into locked position by the biasing action of spring 34. The seat back 14 will always return to the previous position of tilted adjustment since the control apparatus 42 is not affected by the folding of the seat back.

I claim:

1. In combination with a seating unit having a seat including a frame and a seat back foldably mounted on said seat frame, said seat back having a folded position, a seat forming position and a plurality of tilted positions, control apparatus for holding said seat back in said seat forming position and said tilted positions, said control apparatus including a mounting plate secured to said seat frame, a sector means pivotally mounted on said plate, stop means for limiting rotation of said sector means in both directions, a control handle for limiting rotational movement of said sector means between said stop means, said sector means pivotally connected to said seat back for pivotally supporting said seat back on said seat, biasing means urging said seat back to said seat forming position, and latching means for preventing folding of said seat back and permitting tilting thereof, said latching means having a latched position and an unlatched position, said latched position permitting movement of said seat back between said seat forming position and said tilted positions and preventing movement to said folded position, said unlatched position permitting movement to any of said positions.

2. The seating unit as claimed in claim 1 wherein said sector means includes a sector having a plurality of notches formed on the outer surface, and said control handle including a pawl, spring means biasing said pawl into engagement with said notches and the edges of said sector for limiting rotation of said sector when the desired tilted position of said back has been reached.

3. In combination with a seating unit having a seat including a frame and a seat back foldably mounted on said seat frame, said seat back having a folded position, a seat forming position and a plurality of tilted positions, control apparatus for holding said seat back in said seat forming position and said tilted positions, said control apparatus including a mounting plate secured to said seat frame, sector means including a sector having a plurality of notches formed on the outer surface, and said control handle including a pawl, spring means biasing said pawl into engagement with said notches and the edges of said sector for limiting rotation of said sector when the desired tilted position of said seat back has been reached, stop means including a first stop tab for limiting rotation of said sector in one direction when said seat back is in said seat forming position and a second stop tab for limit rotation of said sector in the other direction when said seat back is in full tilted position, a control handle for limiting rotational movement of said sector means between said stop means, said sector means pivotally connected to said seat back for pivotally supporting said seat back on said seat, biasing means urging said seat back to said seat forming position, and latching means for preventing folding of said seat back and permitting tilting thereof.

4. The seating unit as claimed in claim 3 wherein said biasing means includes a spring operably connected to said seat frame and to said sector for urging said sector toward said first stop tab whereby said seat back is urged toward said seat forming position.

5. In combination with a seating unit having a seat including a frame and a seat back foldably mounted on said seat frame, said seat back having a folded position, a seat forming position and a plurality of tilted positions, control apparatus for holding said seat back in said seat forming position and said tilted positions, said control apparatus including a mounting plate secured to said seat frame, a sector means pivotally mounted on said plate, stop means for limiting rotation of said sector means in both directions, a control handle for limiting rotational movement of said sector means between said stop means, said sector means pivotally connected to said seat back for pivotally supporting said seat back on said seat, biasing means urging said seat back to said seat forming position, and latching means including a latch bar secured to said seat frame, a stanchion secured to said seat back for bearing against said latch bar when said seat back is in seat forming position and tilted positions, a latch pivotally mounted on said stanchion for contacting said latch bar for cooperating with said stanchion for holding said seat back in said seat forming position and said tilted positions, a spring biasing said latch against said latch bar, and a handle for manually overcoming said latch spring and moving said latch from contact with said latch bar whereby said seat back may be moved to said folded position for easy entrance past said seating unit.

6. The seating unit as claimed in claim 5 wherein said seat back includes a pivotal connection to said seat frame and said control apparatus controls movement of said pivotal connection for adjusting said seat back between said seat forming position and said tilted positions, said latch bar being a sliding fulcrum for said seat back during movement of said pivotal connection between said positions.

References Cited

UNITED STATES PATENTS

| | | | |
|---|---|---|---|
| 2,959,206 | 11/1960 | Tedesco | 297—367 |
| 2,972,374 | 2/1961 | McKey | 297—374 |
| 3,079,199 | 2/1963 | Tischler | 297—367 |
| 3,104,130 | 9/1963 | Martens | 297—355 |
| 3,185,525 | 5/1965 | Welsh | 297—367 |
| 3,206,248 | 9/1965 | Posh | 297—374 |

JAMES T. McCALL, Primary Examiner

G. O. FINCH, Assistant Examiner

U.S. Cl. X.R.

297—364, 367, 374